Patented Dec. 18, 1951

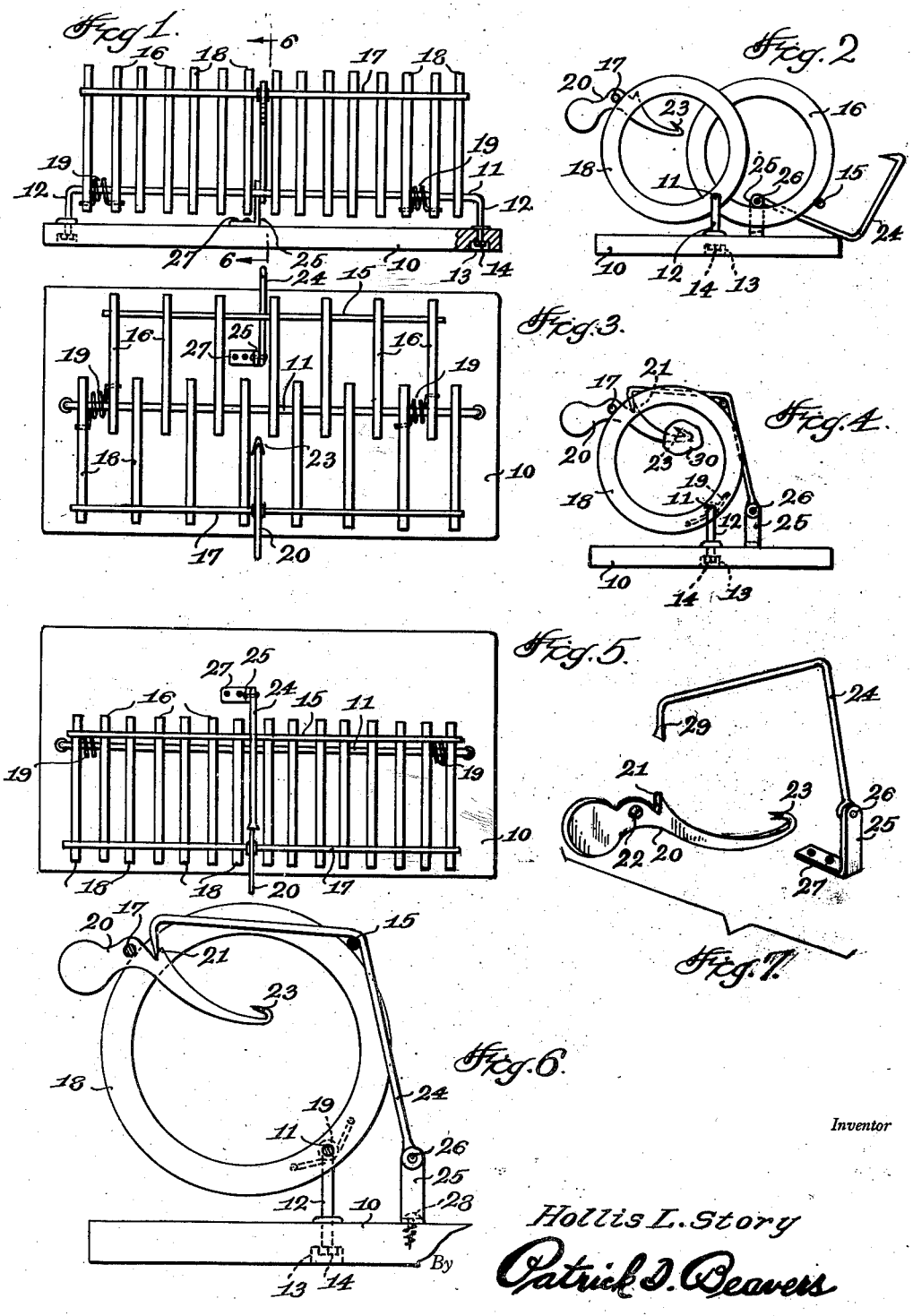

2,578,856

UNITED STATES PATENT OFFICE 2,578,856

ANIMAL TRAP

Hollis L. Story, Paducah, Ky.

Application April 7, 1950, Serial No. 154,542

6 Claims. (Cl. 43—85)

The present invention relates to an animal trap and it consists in the combinations, constructions and arrangements of parts herein described and claimed.

Generally there is provided an animal trap consisting of a base of generally rectangular shape upon which is mounted a longitudinally extending shaft which extends through two sets of spaced rings. Each set of rings is interconnected by means of a stay bar which is fastened to the periphery of each of the rings in such set. The two sets of rings are so mounted upon the shaft that each ring of one set extends between two of the rings of the opposite set. A pair of springs is provided for normally keeping the two sets of rings apart and a latch which is releasable by pressure upon a bait holder, which is formed integrally with the latch, is provided for holding the two sets of rings in concentric positions. The bait holder extends inwardly into the combined sets of rings when they are in latched position so that an animal will be forced to enter into one or the other ends of the combined sets of rings in order to secure the bait held by the bait holder. Such action will release the latch member so that the two sets of rings will be forced apart thereby entrapping the animal or animals as the case may be within the adjacent convolutions of the two sets of rings.

It is accordingly an object of the invention to provide an animal trap which is simple in construction, inexpensive to manufacture and yet effective and efficient in use.

Another object of the invention is the provision of an animal trap having novel means for grasping and holding an animal therein.

A further object of the invention is the provision, in a device of the character set forth, of a novel latch and bait holder both forming a part of the invention.

Other and further objects of the invention will become apparent from a reading of the following specification, taken in conjunction with the drawing, in which:

Figure 1 is a side elevational view of an embodiment of the invention,

Figure 2 is an end elevational view illustrating the trap in a sprung condition, Figure 3 is a plan view of the device illustrated in Figure 2, Figure 4 is a view similar to Figure 2 but showing the trap forming the present invention in set position, Figure 5 is a plan view similar to Figure 3 but showing the trap in set position, Figure 6 is an enlarged sectional view taken along line 6—6 of Figure 1, and Figure 7 is an exploded perspective view illustrating a latch and bait holder both forming parts of the invention.

Referring more particularly to the drawing, there is shown therein an animal trap having a base 10 of generally rectangular shape which has centrally and longitudinally mounted thereon a shaft 11 having dependant ends 12 which extend through the base 10 and terminate in recesses 13 formed in the underside of the base and which are anchored to the base by means of nuts 14.

A stay bar 15 interconnects the peripheries of a series of spaced concentric rings 16 and a second stay bar 17 interconnects a series of spaced rings 18 which are likewise mounted in concentric relation to each other. The rings 18 are affixed to the shaft 11 and the rings 16 are pivotally mounted upon the shaft 11.

A pair of coil springs 19 surround the shaft 11 and the ends thereof bear against the sets of rings 16 and 18 to normally force the same away from each other, as illustrated in Figure 2 of the drawing.

A rocker arm 20 is centrally and pivotally mounted upon the stay bar 17 and is provided with a shoulder 21 upon its upper side adjacent its pivotal point 22 and with a bait hook 23 at its inner extremity, which bait hook 23 will normally lie within the coils of the rings 16 and 18 when the trap is in its set position, as indicated in Figure 4.

A locking arm 24 is pivoted to a post 25, as indicated at 26, which post is provided with a foot 27 which is affixed to the base 10 by means of screws 28 or the like. The free end 29 of the locking arm 24 is adapted to engage the shoulder 21 of the rocker arm 20.

It will be seen that the set of rings 16 is so positioned upon the shaft 11 that each of such rings lies between two of the adjacent rings 18 of the other set of rings.

In operation, it will be apparent that the trap may be set, as illustrated in Figure 4, by bringing the set of rings 16 and the set of rings 18 together against the action of the springs 19 by the operator utilizing one of his hands for such purpose while at the same time using his other hand to pivot the locking arm 24 in a counterclockwise direction, as viewed in Figure 6, until the free end 29 engages with the shoulder 21, bait 30 first having been placed upon the bait hook 23. All of the rings 16 and 18 are now concentrically positioned, as indicated in Figure 4, and the entire ring assembly presents an opening through which an animal, such as a mouse, for example, may crawl to attempt to seize the bait 30. When the animal contacts the bait 30, he will move the arm 20 thus disengaging the end 29 of the arm 24 from the shoulder 21 and thus allowing the two sets of rings 16 and 18 to move away from each other and thus entrapping the animal in the adjacent convolutions of such rings, as illustrated in Figure 2 of the drawing. It will be apparent that more than one animal may be entrapped if more than one animal happens to be within the convolutions of the rings when the trap is set.

While but one form of the invention has been shown and described herein, it will be readily apparent to those skilled in the art that many minor modifications may be made without departing from the spirit of the invention or the scope of the appended claims.

What is claimed is:

1. A device of the character described comprising a base, a first set of concentric spaced rings pivotally mounted on said base, a second set of like rings fixed on said base in interleaving condition with said first set, springs for normally forcing said sets of rings out of mutually concentric condition, a latch for holding said sets of rings in mutually concentric condition, and a bait holder associated with said latch.

2. A device of the character described comprising a base, a shaft mounted on said base in spaced vertical relation thereto, a first set of concentric spaced rings pivotally mounted on said shaft, a second set of like rings fixed on said shaft in interleaving condition with said first set of rings, springs for normally forcing said sets of rings out of mutually concentric condition, a latch for holding said sets of rings in mutually concentric condition, and a bait holder associated with said latch.

3. A device of the character described comprising a base, a shaft mounted on said base in spaced vertical relation thereto, a first set of concentric spaced rings pivotally mounted on said shaft, a second set of like rings fixed on said shaft in interleaving condition with said first set of rings, a pair of springs surrounding said shaft and adapted to normally force said sets of rings out of mutually concentric condition, a latch for holding said sets of rings in mutually concentric condition, and a bait holder associated with said latch.

4. A device of the character described comprising a base of generally rectangular contour, a longitudinally extending shaft mounted on said base in vertical spaced relation thereto, a first set of spaced concentric rings pivotally mounted on said shaft, a stay bar affixed to the periphery of each ring of said first set of rings, a second set of like rings fixed on said shaft in interleaving condition with said first set of rings, a stay bar affixed to the periphery of each ring of the second set of rings, a pair of springs surrounding said shaft and adapted to normally force said sets of rings out of mutually concentric condition, a latch for holding said sets of rings in mutually concentric condition, and a bait holder associated with said latch.

5. A device of the character described comprising a base of generally rectangular contour, a longitudinally extending shaft mounted on said base in vertical spaced relation thereto, a first set of spaced concentric rings pivotally mounted on said shaft, a stay bar affixed to the periphery of each ring of said first set of rings, a second set of like rings fixed on said shaft in interleaving condition with said first set of rings, a stay bar affixed to the periphery of each ring of the second set of rings, a pair of springs surrounding said shaft and adapted to normally force said sets of rings out of mutually concentric condition, a latch for holding said sets of rings in mutually concentric condition, and a bait holder associated with said latch, said latch comprising a rocker arm pivotally mounted on one of said stay bars and having a shoulder formed therein, a lock bar pivoted at one end to said base and having its other end passing over the other of said bars and engageable with said shoulder.

6. A device of the character described comprising a base of generally rectangular shape, a longitudinally extending shaft mounted on said base in vertical spaced relation thereto, a first set of spaced concentric rings pivotally mounted on said shaft, a stay bar affixed to the periphery of each of the rings in said first set of rings, a second set of like rings fixed on said shaft in interleaving condition with said first set of rings, a stay bar affixed to the periphery of each ring of the second set of rings, a pair of springs surrounding said shaft and adapted to normally force said sets of rings out of mutually concentric condition, a latch for holding said sets of rings in mutually concentric condition, and a bait holder associated with said latch, said latch comprising a rocker arm pivotally mounted on one of said stay bars and having a shoulder formed therein, a lock bar pivoted at one end of said base and having its other end passing over the other of said bars and engageable with said shoulder, and said bait holder being formed integrally with said rocker arm and adapted to lie within the space encompassed by said sets of rings when the sets are in mutually concentric condition.

HOLLIS L. STORY.

REFERENCES CITED

The following references are of record in the file of this patent:

UNITED STATES PATENTS

| Number | Name | Date |
|---|---|---|
| 1,299,109 | Black | Apr. 1, 1919 |
| 1,359,724 | Mosby | Nov. 23, 1920 |